United States Patent Office 2,752,336
Patented June 26, 1956

2,752,336

PROCESS FOR THE PURIFICATION OF LACTAMS

Johannes W. P. Boon, Berg and Terblijt, and Leonard W. F. Kampschmidt, Beek, Netherlands, assignors to Stamicarbon N. V., Heerlen, Netherlands No Drawing. Application November 2, 1953,
Serial No. 389,855

Claims priority, application Netherlands
November 15, 1952

5 Claims. (Cl. 260—239.3)

The present invention relates to lactams and, more particularly, to novel procedures for purifying contaminated lactams.

It is well known that lactams as obtained by, for example, Beckmann transformation of cyclic ketoximes, depolymerization of polyamides prepared from lactams or washing out polyamides, contain contaminations which cannot be completely removed, even if the lactam is subjected to repeated distillation. These contaminations produce discoloration in the lactam when the latter is exposed to light and air with the result that contaminated lactams are not suitable for the preparation of polymers, due to the fact that the discolorations occurring therein render the polymers obtained therefrom unfit for working up into filaments, fibres, films and other molded products.

As a result of the above mentioned disadvantages, it has previously been proposed to subject lactams to various types of purification techniques. However, all of these prior techniques, while desirable in some respects, possess one or more undesirable features. For instance, it is well known that contaminated lactams may be purified by distillation in vacuo after the addition of small amounts of substances showing alkaline or acid reaction or possessing oxidizing or reducing properties, for example, perborates, percarbonates, mixtures of zinc and sodium hydroxide solutions, or mixtures of zinc and sulfuric acid. However, this particular purification procedure is not commercially attractive because of the considerable losses of lactam which occur through a partial decomposition of the lactam.

It has also been proposed to purify lactams by treating the same with hydrogen in the presence of a hydrogenation catalyst and subsequently distilling off the lactam. Fairly satisfactory lactam purification is obtained thereby, but one serious objection to such process lies in the fact that it requires the use of relatively expensive pressure resistant apparatus.

Accordingly, the principal object of the present invention is to provide a novel procedure for purifying lactams whereby the difficulties hitherto encountered in lactam purification are avoided.

A more specific object of the invention is to provide a lactam purifying process which so effectively eliminates contaminants from the lactam that the latter is free from any tendency to discolor upon exposure to air and light and is otherwise highly desirable for use in the production of polymers and polymeric products.

A further object of the invention is to provide a process for purifying contaminated lactams whereby all of the contaminating materials may be separated from the lactam with little, or substantially no, loss of lactam.

Still further objects will be apparent from the following detailed description of the invention which is given for illustrative purposes only and is not intended to limit same.

The foregoing objects are realized, according to the present invention, by a process involving the steps of first dissolving the contaminated lactam in an inert organic solvent therefor, subjecting the lactam solution to oxidation while said solution is in a homogeneous liquid phase and then separating the oxidized contaminating material from the lactam. If desired, the process may also include, as more fully discussed hereinafter, a reduction treatment with conventional reducing agents, such as sodium hydrosulfite or aluminum amalgam, before or after the oxidation step.

The success of the present process is due, at least to a substantial extent, to the discovery that when the lactam solution is oxidized as a homogeneous liquid phase, the materials normally contaminating lactams are selectively and quantitatively oxidized into a readily separable form while the lactam is unaffected, or at least substantially unaffected. This, of course, is in complete contrast to prior art procedures wherein a substantial part of the lactam is always decomposed along with the contaminants.

Any organic solvent which is inert under the reaction conditions may be utilized, according to the present invention. Accordingly, suitable solvents are the aromatic and hydroaromatic hydrocarbons, such as benzene and decahydronaphthalene, as well as carbon tetrachloride, nitromethane, and chloroform, although it will be appreciated that the invention is not restricted to these specific solvents.

The concentration of the lactam in the inert, organic solvent may be varied over a rather wide range to give satisfactory results. Thus, for example, suitable purification can be obtained starting with a lactam concentration of from 10 to 50% by weight. However, in general, it is preferred to use solutions having a lactam concentration of not more than 30% by weight, since at higher concentrations the lactam may also be oxidized to a noticeable extent.

The oxidation treatment, according to the invention, may be carried out with any compound or compounds possessing oxidizing properties. As typically suitable materials there may be mentioned potassium permanganate, potassium bichromate, hydrogen peroxide, ozone, persalts, and the like.

As indicated, it is essential that the oxidation treatment be carried out in a homogeneous liquid phase, in order to obtain the results of the invention. In other words, if the lactam solution separates out into two layers, i. e., an organic liquid phase and an aqueous phase, the results of the invention are not obtained and considerable amounts of lactam are lost due to oxidation thereof in the aqueous phase. Accordingly, if the contaminated lactam contains a substantial amount of water and/or if the oxidation agent or agents are supplied to the lactam solution in the form of aqueous solutions, it is sometimes advantageous to dry the lactam solution beforehand, in order to prevent the formation of a separate aqueous phase which would contain a part of the lactam and become a part of the aqueous phase in which the oxidizing agent is dissolved. In this connection, it is to be noted that as long as the lactam solution is in a homogeneous liquid phase, i. e., there is, in essence, only a single liquid phase rather than two separate phases or layers, the oxidation can be effectively carried out with aqueous solutions of the oxidizing agent without any substantial dissolution and subsequent oxidation of the lactam in the aqueous phase of the oxidizing agent.

Drying of the lactam for the purpose referred to in the preceding paragraph may be effected in any well known manner, for example, by treating the lactam with dehydrating agents, such as solid sodium hydroxide, or anhydrous sodium sulfate, or by azeotropic distillation.

While the oxidation treatment may be effected using aqueous solutions of the oxidizing agents, e. g. potassium permanganate solutions of from 5% to 6% by weight concentration, it is also possible to carry out the oxidation with dry or solid oxidizing agent. In this event, the solution of lactam in organic solvent may contain some water, up to, for example, 5%.

The oxidation treatment may be satisfactorily carried out at various temperatures, e. g., temperatures between 20° C. and 100° C. It is usually most convenient, however, to oxidize at the boiling temperature of the solvent since the reaction proceeds rapidly at this temperature.

As will be appreciated, the duration of the oxidation treatment can be varied and will depend upon other operating conditions, e. g., amount of impurities, oxidation temperature, and oxidizing agent. However, it has been found that generally the oxidation can be completed in from ¼ to 1 hour.

As previously indicated, the lactam solution may also be subjected to treatment with appropriate reducing agents, either before or after the oxidation step and, in some cases, this reduction step appears to simplify the removal of contaminations. Usually, the lactam being purified is not affected by reducing agents, and, as a result, the conditions under which reduction is effected need less attention. However, care should be taken in selecting the reducing agent in order to insure that the decomposition products thereof can be easily and completely removed from the lactam being treated. As previously indicated, sodium hydrosulfite and aluminum amalgam have given desirable results, although other reducing agents may also be used.

After oxidation has been effected, the lactam solution may be dried in order to remove decomposition products of the oxidation agent, e. g., solid substances that separate out during the drying may be removed by filtration. Thereafter, the lactam may be recovered in any of a number of ways, including, for example, distillation, which preferably is carried out in vacuo and in the presence of solid NaOH in small amounts, e. g., from 0.5 to 2 parts NaOH per 100 parts of lactam to be distilled. The lactam thus obtained and polymers derived therefrom both appear to be much more resistant to atmospheric influences and light than lactam purified by prior techniques, and the resulting polymers.

The present process is further illustrated by the following examples which are given for illustrative purposes only and are not intended to limit the scope of the invention.

Example I 200 grams of crude caprolactam, obtained by depolymerization of polyamino caproic acid, were dissolved in 800 grams of benzene and heated to the boiling point. After the addition of 3 grams of $KMnO_4$, in the form of a saturated aqeuous solution, the mixture was boiled for half an hour, after which the water present was distilled off as an azeotropic mixture with benzene. During this procedure, the excess of $KMnO_4$ and its decomposition products precipitated quantitatively. After filtration, the benzene was distilled off, 0.5% by weight of NaOH added and the lactam was distilled in vacuo. There were obtained 181 grams of lactam which, like the polymer prepared therefrom, was very resistant to atmospheric influences.

Example II

During the neutralization of a caprolactam solution obtained by a Beckmann transformation of cyclohexanonoxime, benzene was added until a 25% lactam solution in benezene was obtained.

The water dissolved therein was removed by treatment with solid NaOH. After filtration, the mixture was oxidized in the manner described in Example I. After the oxidation, the water present was removed with solid NaOH and the solution filtered. The filtered solution gave a yield of 95% lactam which, like the polymer prepared therefrom, did not become discolored by light and air.

Example III

One kg. of a 30% caprolactam solution in benzene, obtained in the manner described in Example II, was dried by distilling off the benzene-water azeotrope. Thereafter, 18 cc. of a 3-N potassium bichromate-sulfuric acid solution were added to the boiling solution and boiling continued for three hours. After the solution was cooled down, the water present was removed by means of solid NaOH and the solution filtered. By distilling the solution with 0.5% of NaOH, 282 grams of caprolactam were recovered which, like the product mentioned in Examples I and II, was of excellent quality.

Example IV 150 grams of crude caprolactam obtained by means of a Beckmann transformation of cyclohexanonoxime were dissolved in 600 grams of carbon tetrachloride and boiled for 30 minutes with 4 cc. of a 30% $H_2O_2$ solution. After removal of the solvent, the remaining substance was distilled in vacuo and 145 grams of pure caprolactam isolated. This purified product showed no tendency to discolor even after long standing.

Example V 50 grams of crude caprolactam prepared in accordance with Example IV were dissolved in 200 grams of alcohol-free, moist chloroform. The solution was cooled to 0° C. and thereafter oxygen, containing 10% by volume of ozone, was passed through the solution for thirty minutes by means of an electrolytic ozone generator.

After the solvent was distilled off and 0.5% of NaOH added, the caprolactam was recovered by distillation in vacuo, the yield amounting to 83%. The lactam showed no tendency to discolor.

Example VI 250 grams of a brownish caprolactam were dissolved in 750 grams of nitro-methane and, after addition of 6 cc. of a 30% $H_2O_2$ solution, the solution was heated for 60 minutes. After evaporation of solvent, the lactam was distilled in vacuo in the presence of 0.5% of NaOH. In this way, a yield of 228 grams of lactam was obtained, the lactam being found by aging tests to possess excellent lightproof properties.

Example VII 150 grams of crude caprolactam obtained by washing polyamino caproic acid with water, were dissolved in 850 grams of benzene. This solution was saturated with water and at boiling temperature reduced with 50 grams of solid $Na_2S_2O_5$ for sixty minutes.

After cooling down, the solution was dried with solid NaOH and filtered.

Then, one gram of $KMnO_4$ was added in the form of a saturated aqueous solution and the mixture boiled for 20 minutes. After the oxidation, the water contained in the solution was removed with solid sodium hydroxide and the solution filtered. The benzene was then distilled off and the remaining solution subjected to a vacuum distillation with 0.5% of NaOH. In this way, 132 grams of lactam were obtained, some remaining entirely colorless even after standing for four months.

The process of the invention is suitable for purifying lactams derived from any source. Thus, for example, lactams obtained by Beckmann transformation of cyclic ketoximes, by depolymerization of polyamides prepared from lactams or by washing out polyamides, such as caprolactam, butyrolactam and valerolactam, may be purified according to the present invention.

Summarizing the foregoing, the present invention is concerned with the purification of lactams by a process which involves subjecting the contaminated lactam, while dissolved in an inert organic solvent, to oxidation in a homogeneous liquid phase, i. e., under conditions whereby the formation of separate liquid layers is avoided, after which the contaminations are separated from the lactam by distillation and filtration. If desired, the process may also include a reduction treatment either before or after the oxidation.

It will be appreciated that various modifications may be made in the invention as described herein without in any way deviating from the scope of the invention as defined in the appended claims.

We claim:

1. A process for purifying a contaminated lactam which comprises forming a substantially water-free, single phase, homogeneous solution of the contaminated lactam dissolved in an inert organic solvent, thereafter freeing contaminants from said lactam by subjecting said lactam solution to oxidation at the boiling point of said solution in the absence of any substantial amount of water so as to maintain said solution throughout said oxidation in its single phase, homogeneous form without the formation of an aqueous layer and then separating the thus treated lactam from contaminating material freed therefrom by said oxidation.

2. The process of claim 1, wherein the lactam, after oxidation, is separated from contaminating material by filtering off any precipitated material, and distilling under vacuo in the presence of sodium hydroxide.

3. The process of claim 1, wherein the contaminated lactam subjected to purification is obtained by Beckmann transformation of a cyclic ketoxime.

4. The process of claim 1, wherein the contaminated lactam subjected to purification is obtained by depolymerization of polyamides prepared from lactams.

5. A process for purifying contaminated caprolactam which comprises forming a substantially water-free, single phase, homogeneous solution of the contaminated lactam dissolved in an inert organic solvent, the lactam concentration of said solution not exceeding 30% by weight, subjecting said lactam solution to oxidation at the boiling point of said solution and in the absence of any substantial amount of water so as to maintain said solution throughout said oxidation in its single phase, homogeneous form without the formation of an aqueous layer and then separating the thus treated lactam from contaminating material freed therefrom by said oxidation.

References Cited in the file of this patent

UNITED STATES PATENTS

| 2,305,103 | Osgood | Dec. 15, 1942 |
| 2,419,256 | Dorn | Apr. 22, 1947 |
| 2,573,374 | Wichterle | Oct. 30, 1951 |

FOREIGN PATENTS

| 504,774 | Belgium | Aug. 14, 1951 |
| 748,291 | Germany | Oct. 31, 1944 |
| 850,746 | Germany | Sept. 29, 1952 |
| 892,926 | France | Jan. 17, 1944 |

OTHER REFERENCES

MacArdle: "Use of Solvents" (Van Nostrand), pp. 3, 8, (1925).